(12) United States Patent
Cole, Jr. et al.

(10) Patent No.: US 10,240,648 B2
(45) Date of Patent: Mar. 26, 2019

(54) ELECTROMAGNETIC-RELEASED, MULTI-DISC ENCLOSED SAFETY BRAKE

(71) Applicant: PT Tech, LLC, Sharon Center, OH (US)

(72) Inventors: Richard E. Cole, Jr., LaGrange, OH (US); Timothy A. Clapp, Queen Creek, AZ (US); David A. Farwell, Atwater, OH (US)

(73) Assignee: PT TECH, LLC, Sharon Center, OH (US)

( * ) Notice: Subject to any disclaimer, the term of this patent is extended or adjusted under 35 U.S.C. 154(b) by 0 days.

(21) Appl. No.: 15/547,194

(22) PCT Filed: Jan. 28, 2016

(86) PCT No.: PCT/US2016/015271
§ 371 (c)(1),
(2) Date: Jul. 28, 2017

(87) PCT Pub. No.: WO2016/123289
PCT Pub. Date: Aug. 4, 2016

(65) Prior Publication Data
US 2018/0023641 A1    Jan. 25, 2018

Related U.S. Application Data

(60) Provisional application No. 62/206,964, filed on Aug. 19, 2015, provisional application No. 62/109,205, filed on Jan. 29, 2015.

(51) Int. Cl.
*F16D 55/28*    (2006.01)
*F16D 55/36*    (2006.01)
(Continued)

(52) U.S. Cl.
CPC .............. *F16D 55/36* (2013.01); *B63B 21/16* (2013.01); *B63B 27/08* (2013.01); *B66D 5/14* (2013.01);
(Continued)

(58) Field of Classification Search
CPC ......... B66B 11/04; B66B 11/08; B63B 21/00; F16D 55/14; F16D 55/36; F16D 55/40; F16D 55/28
(Continued)

(56) References Cited

U.S. PATENT DOCUMENTS 1,660,497 A  *  2/1928  Treiber ................. F16D 13/648
                                                         192/70.15
2,025,098 A  *  12/1935  Dudick ................... F16D 55/36
                                                         188/171
(Continued)

FOREIGN PATENT DOCUMENTS

EP          0961047 A2    12/1999
WO       2014082708 A1     6/2014
WO     WO2014082708    *   6/2014    ............. F16D 65/18

*Primary Examiner* — Christopher P Schwartz
(74) *Attorney, Agent, or Firm* — Renner Kenner Greive Bobak Taylor & Weber

(57) ABSTRACT

An electromagnetic-released, multi-disc, enclosed safety brake for primary use in offshore marine winch applications includes a stationary coil housing that encompasses springs that apply pressure to an armature, a pair of separator plates, three friction plates and a stationary endplate. The multi-disc brake is released by means of a DC voltage applied to the brake coil. The excited coil generates an electromagnetic force that attracts the armature across an air-gap thus reducing the spring force applied to the disc pack. The brake is applied when the DC voltage is removed from the brake coil. Various structures and methodologies for reducing vibrations in the brake are also provided.

19 Claims, 13 Drawing Sheets

(51) Int. Cl.
*B66D 5/14* (2006.01)
*B66D 5/30* (2006.01)
*B63B 21/16* (2006.01)
*B63B 27/08* (2006.01)
*F16D 65/00* (2006.01)
*F16D 65/16* (2006.01)
*F16D 65/42* (2006.01)
*F16D 66/02* (2006.01)
*F16D 121/22* (2012.01)

(52) U.S. Cl.
CPC ............ *B66D 5/30* (2013.01); *F16D 65/0006* (2013.01); *F16D 65/16* (2013.01); *F16D 65/42* (2013.01); *F16D 66/02* (2013.01); *F16D 2121/22* (2013.01)

(58) Field of Classification Search
USPC ........ 188/1.11 L, 1.11 R, 71.5, 171, 218 XL, 188/156–164
See application file for complete search history.

(56) References Cited

U.S. PATENT DOCUMENTS

| | | | | |
|---|---|---|---|---|
| 2,718,292 A * | 9/1955 | Meilander | ............... | F16D 27/02 192/21.5 |
| 3,018,852 A * | 1/1962 | Stanton | ................... | F16D 55/40 188/1.11 R |
| 3,613,849 A * | 10/1971 | Pape | .................... | F16D 13/757 188/196 P |
| 3,665,231 A * | 5/1972 | Wendler | ................... | F16D 55/28 310/77 |
| 4,279,330 A | 7/1981 | Pottorff et al. | | |
| 4,445,596 A * | 5/1984 | Waters | .................... | F16D 55/28 188/171 |
| 4,576,255 A * | 3/1986 | Mery | ........................ | F16D 3/06 188/71.5 |
| 4,658,936 A * | 4/1987 | Moseley | ................. | F16D 55/40 116/208 |
| 4,721,191 A * | 1/1988 | Dowell | .................... | F16D 55/14 188/218 XL |
| 4,739,969 A | 4/1988 | Eckersley et al. | | |
| 5,186,287 A * | 2/1993 | Lindner | ................... | F16D 55/36 188/171 |
| 5,228,541 A * | 7/1993 | Plude | ..................... | F16D 66/02 116/208 |
| 5,310,025 A * | 5/1994 | Anderson | ............... | F16D 55/36 188/73.37 |
| 5,850,895 A * | 12/1998 | Evrard | .................... | F16D 65/12 188/264 A |
| 6,237,730 B1 * | 5/2001 | Dropmann | ............. | F16D 55/28 188/163 |
| 6,459,182 B1 * | 10/2002 | Pfann | ................... | H02K 7/1025 188/161 |
| 6,460,659 B1 * | 10/2002 | Schaffer | ................. | F16D 66/02 188/1.11 R |
| 7,073,641 B2 * | 7/2006 | Carriot | .................... | B66D 5/14 188/161 |
| 9,279,468 B1 * | 3/2016 | Philpott | ................. | F16D 66/021 |
| 2013/0248303 A1 * | 9/2013 | Okuno | .................... | B60T 1/062 188/67 |

* cited by examiner

ELECTROMAGNETIC-RELEASED, MULTI-DISC ENCLOSED SAFETY BRAKE

CROSS-REFERENCE TO RELATED APPLICATIONS

This application claims the benefits of U.S. Provisional Patent Application Nos. 62/109,205, filed Jan. 29, 2015 and 62/206,964, filed Aug. 19, 2015, incorporated herein by reference.

TECHNICAL FIELD

The invention herein resides in the art of spring-applied, electromagnetic-released motor brakes. Specifically, the invention relates to winch applications typically used in association with offshore marine applications driven by electric motors.

BACKGROUND OF THE INVENTION

As the market for VFD (variable frequency drive) motors in the marine winch environment has matured, the need for higher rotational speed is desired. The higher rotational speeds generate substantially more kinetic energy which is then combined with the potential energy from the suspended load. During an over-speed condition, the delay in the control system will allow an increase in motor speed beyond the motor max speed, thus further increasing the kinetic energy. As the interest in such high-speed applications increases, the desirability of an enclosed spring-applied, electrically released brake capable of absorbing the higher energy increases.

Common brakes in the industry only utilize a single friction disc. Additional torque and energy capacity is obtained by increasing the diameter of the friction interfaces. Increasing the diameter of the friction interfaces also increases the centripetal force and reduces the allowable speed. Increasing the diameter and number of friction interfaces may induce instability that is detected by a vibration or whirling condition. Multi-disc brakes are typically limited to horizontal shaft applications due to increased drag of the disc pack when operating in a vertical shaft configuration.

Another necessary feature for a brake operating in a marine environment is ease of maintenance and accessibility. During commissioning and maintenance procedures, the brakes may require a provision to manually release the disc pack without using the electromagnetic release function.

Further, a major drawback to multi-disc brake designs in the past has been the friction-induced vibration/shaft whirl that often occurs during a braking event.

DISCLOSURE OF INVENTION

In light of the foregoing, it is a first aspect of the invention to provide three or more torque blocks to position the separator discs and transfer the torque into the mounting plate. The linear contact between the torque blocks and separator discs also prevents binding caused by rapid thermal expansion generated during a dynamic braking event.

It is another aspect of the invention to provide one or more tapered friction interfaces which provide stability to the motor shaft during a braking event.

An additional aspect of the invention is to provide self-contained separator spring assemblies that provide equal separation in vertical shaft configurations.

Still another aspect of the invention is the provision to adjust for wear by use of one or more shims located between the torque block and endplate.

Still a further aspect of the invention is the provision for a mechanical indication of wear on the face of the brake viewed parallel with the motor shaft. The visual indicator requires no measurement tools.

Yet a further aspect of the invention is the provision to manually release the brake without removing the cover using the release screws in combination with the wear indicator pin.

An additional aspect of the invention is the provision of slotted separator discs to reduce thermal buckling and surface temperature thus increasing the energy capacity of the brake.

Another aspect of the invention is to provide an electromagnetic-released multi-disc safety brake having a sealed enclosure between an input and output.

It is another aspect of the invention to provide springs aligned axially with the endplate to alter its stiffness, which has been shown as an effective means of eliminating objectionable vibration/shaft whirl.

Another aspect of the invention is to axially damp the armature and separator plates using spring-applied friction pads, which bi-directionally resist their motion and thereby damp the undesired vibration.

Yet another aspect of the invention is axially damping of the armature's movement with a fluid-type shock absorber to absorb and dissipate the energy from the friction-induced vibration.

An additional aspect of the invention is to damp the motion of the armature by the implementation of a friction-damped linkage, which absorbs the axial energy of the armature as it is vibrationally excited.

The foregoing and other aspects of the invention that will become apparent as the detailed description proceeds are achieved by a multi-disc electric motor brake, comprising a motor mounting plate; an electromagnetic coil attached to said mounting disc; an armature in operative engagement with said electromagnetic coil; a plurality of springs in axially biasing engagement with said armature; a hub received on an end of a motor shaft, said hub engaging a plurality of friction rotors; a plurality of torque reaction members attached to said mounting plate and in engagement with a plurality of separator stators interleaved with said friction rotors and forming a disc pack; and an endplate attached to said torque blocks and axially encapsulating said disc pack.

Other aspects of the invention are achieved by a safety brake for offshore marine winch applications, comprising a stack of alternatingly interleaved separator discs and friction discs; a stationary endplate at a first end of said stack; an armature at a second end of said stack opposite said first end; a stationary coil housing having an electromagnetic coil received within a circular recess therein and a plurality of springs received by said stationary coil housing and urging against said armature; and wherein said plurality of springs urge engagement of said stack of alternatingly interleaved separator and friction plates between said armature and stationary endplate, and energization of said electromagnetic coil draws said armature to release such engagement.

BRIEF DESCRIPTION OF THE DRAWINGS

For a complete understanding of the various aspects of the invention, reference should be made to the following detailed description and accompanying drawings wherein.

DETAILED DESCRIPTION OF PREFERRED EMBODIMENTS

Figure 1:
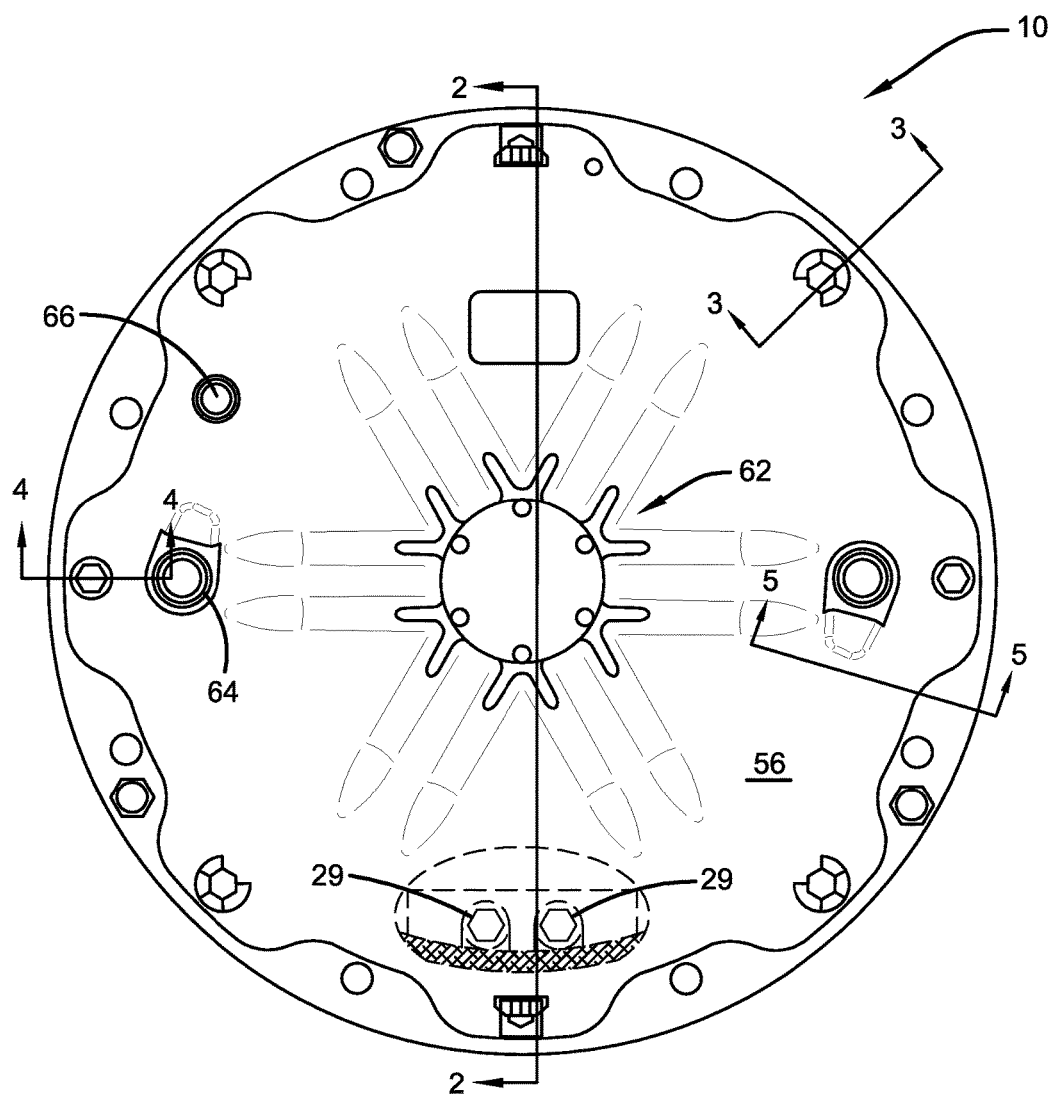
FIG. 1 is a side elevational view of the safety brake of the invention.
Figure 2:
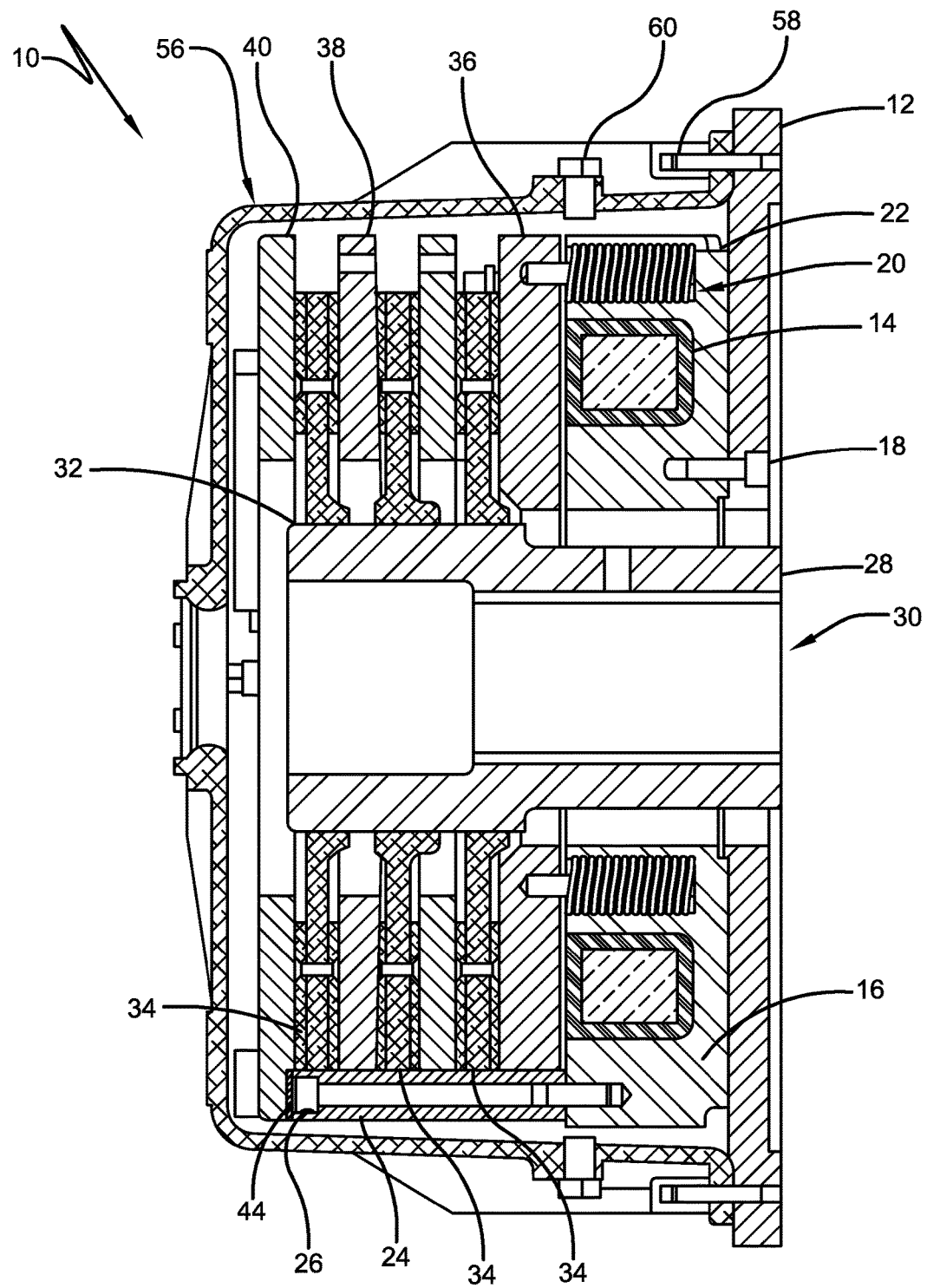
FIG. 2 is a cross-sectional view of the invention of FIG. 1, taken along the line 2-2.

Referring now to the drawings, and more particularly FIGS. 1 and 2, it can be seen that the motor brake assembly according to the invention is designated generally by the numeral 10. A mounting plate 12 is adapted to mount a motor flange (not shown) and is positioned by means of a pilot interface. An electromagnetic coil assembly 14 is maintained by a housing 16, which is secured to the mounting plate 12 by appropriate screws 18. The coil assembly 14 is comprised of a wound copper coil and electrically-isolating potting. The coil housing 16 includes cylindrical pockets 20 containing apply springs 22 that are uniformly circumferentially spaced within the housing 16. The torque blocks 24, as shown in FIG. 2, are secured to the coil housing using threaded fasteners 26 and located by means of appropriate alignment bushings. There are preferably three torque blocks 24, each rectangular in cross-section and circumferentially spaced 120° apart. Torque blocks have been found to be more stable and occupy a smaller footprint than typical torque pins.

Figure 3:
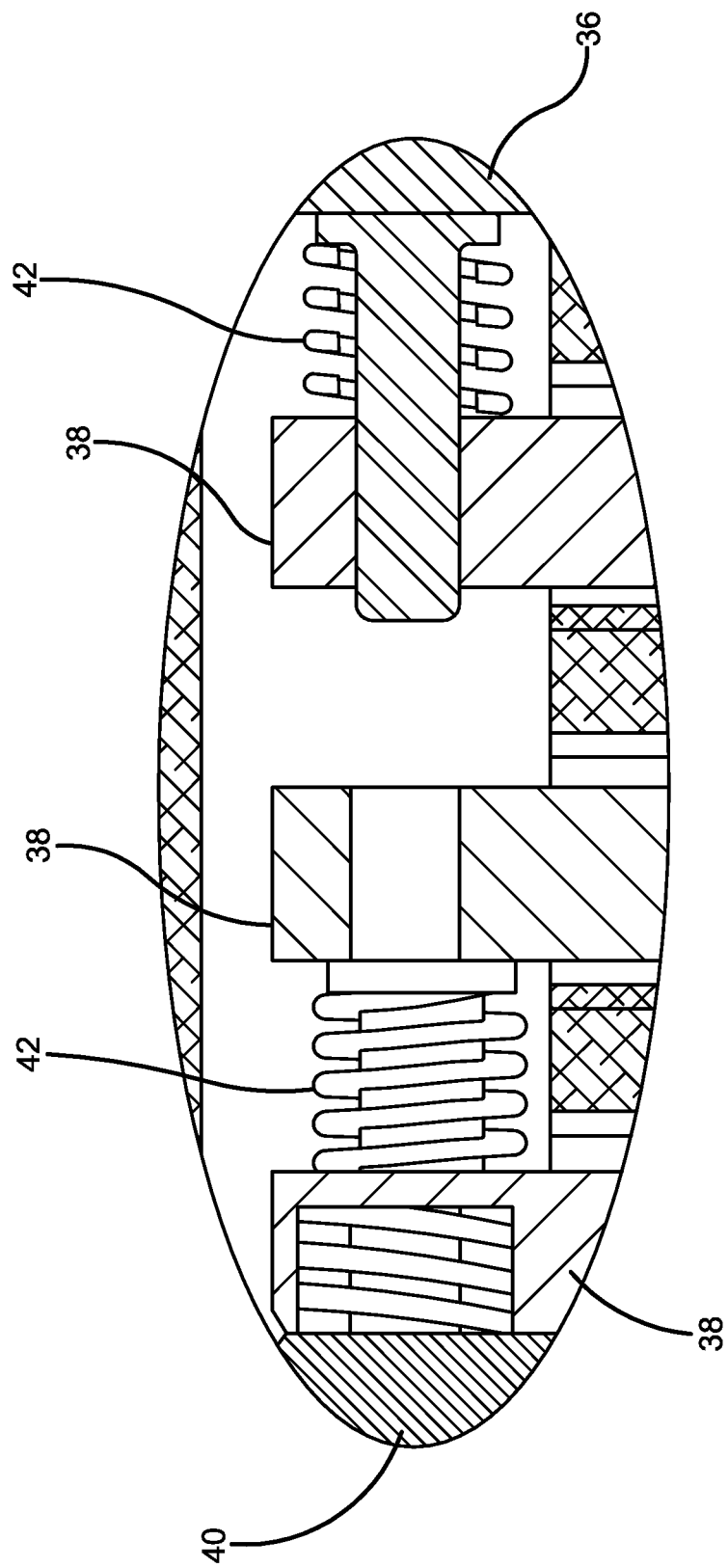
FIG. 3 is a cross-sectional view of the invention of FIG. 1, taken along the line 3-3.

The brake hub 28 has a bore 30 to secure the motor shaft by common industry standards, such as shrink fitting. The brake hub includes an external spline 32 that interfaces with multiple friction plates discs 34. The springs 22 apply axial force to the armature 36 when the brake is engaged. The friction discs are interposed between separator plates or discs 38 and endplate 40. Separator spring assemblies 42, as shown in FIG. 3, are located between the armature 36 and a separator disc 38 and between the endplate 40 and the other separator disc 38. This arrangement ensures desired separation of the discs when the safety brake is disengaged, and particularly so when the brake is vertically oriented with gravity urging the disks together. The adjustment shims 44, as shown in FIG. 2, are located between the torque blocks 24 and endplate 40. The torque blocks 24 are clamped to the coil housing 16 by threaded fasteners 26, which serve to secure the torque blocks 24 during servicing. Pairs of fasteners or bolts 29, shown in FIG. 1, pass through the endplate 40 and associated torque block 24 to the coil housing 16, securing those elements together. The shims 44 are removed to accommodate wear in the disc stack.

Figure 7:
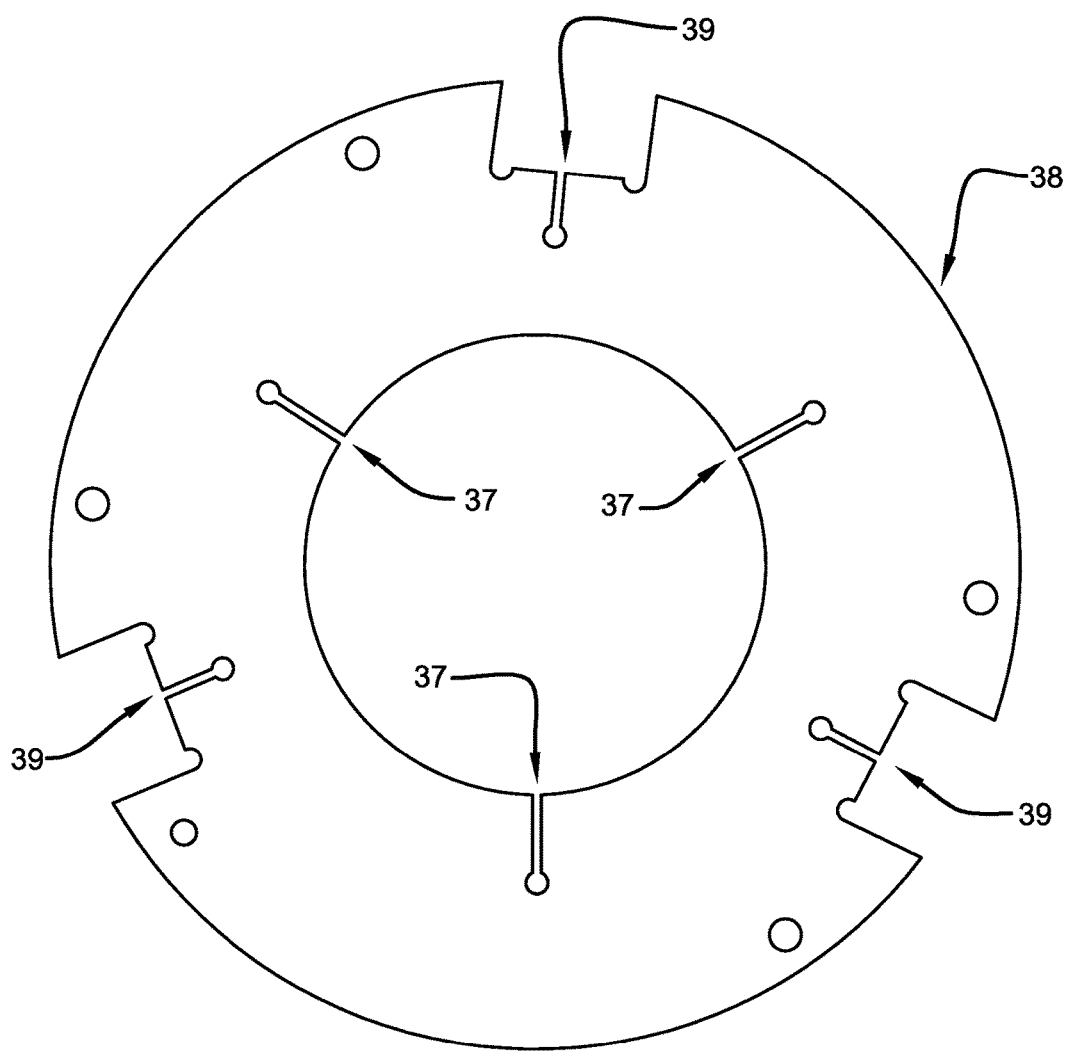
FIG. 7 is an illustrative view showing the slotted separator disc of the invention.

With continued attention to FIG. 2, it can be seen that the interleaved discs 34, 38 are radially tapered in thickness. In a preferred embodiment, the friction discs or rotors increase in thickness radially outwardly, while the separator or stator discs decrease in thickness in that direction. The tapers may be reversed. In either event, it is desired that the stators and rotors fully nest, remain stable, and do not "walk" in use. It has been found that complementary tapers achieve this end. Moreover, and as shown in FIG. 7, the separator discs preferably include radial slots 37, 39 outwardly from an inner circumference and inwardly from an outer edge to a central region of the disc body. These uniformly spaced slots serve to prevent or limit thermal distortion of the discs.

Figure 4:
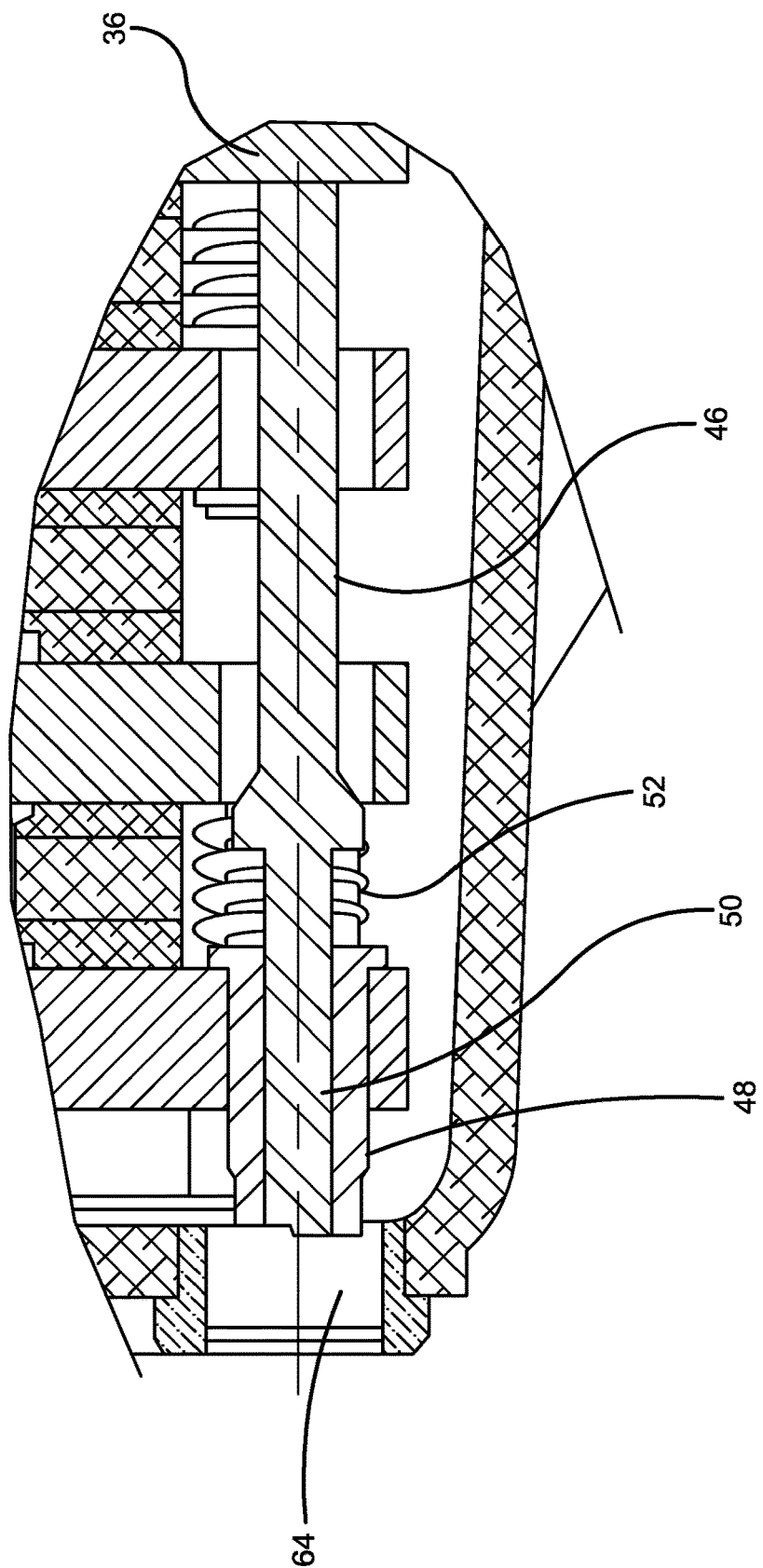
FIG. 4 is a cross-sectional view of the invention of FIG. 1, taken along the line 4-4.
Figure 5:
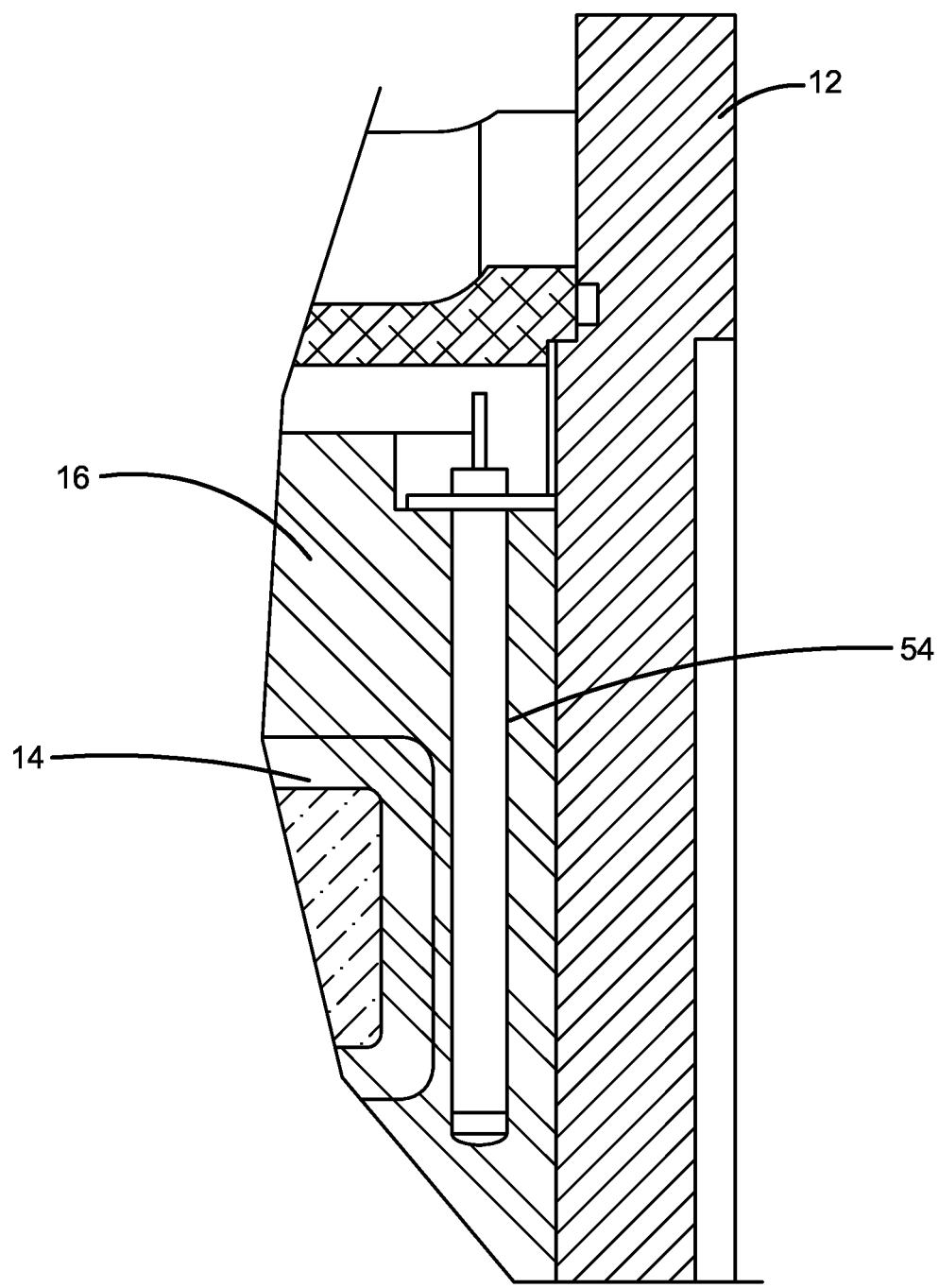
FIG. 5 is a cross-sectional view of the invention of FIG. 1, taken along the line 5-5.

A wear indicator pin 46, as shown in FIG. 4, is secured to a release screw 48 by means of an O-ring 50. A spring 52 is used to assure the wear indicator pin remains in contact with the armature 36 during operation. A cartridge-style heater 54, shown in FIG. 5, is mounted to the coil housing 16. The heater is energized when the brake is set to prevent corrosion caused by moisture contained within the brake assembly.

A cover 56, as shown in FIGS. 1 and 2, is used to protect the brake from the environment. The cover is positioned by means of a pilot interface and is secured to the mounting plate 12 by the use of threaded studs 58 and encapsulated nuts 60. The cover 56 also includes provisions 62 to mount an encoder as may be required for the motor's controller.

As shown in FIGS. 2 and 4, a sight glass 64 secured to the cover 56 allows visual access to the mechanical wear indicator 46. As is apparent from FIG. 4, the sight glass 64 is removable to allow access to the release screw, which is provided with a hex head that may be rotated by socket or wrench to manually release the brake by overcoming the springs opposing the armature 36. As shown, the hex head of the release screw 48 is notched, having upper and lower top edges, the former being a level for wear assessment when the disc stack is new or refurbished, and latter being for such assessment when the shims 44 have been removed. A smaller sight glass 66 is also secured to the cover 56 to allow visual access to confirm the presence of adjustment shims 44 interposed between the endplate 40 and torque blocks 24.

Figure 6:
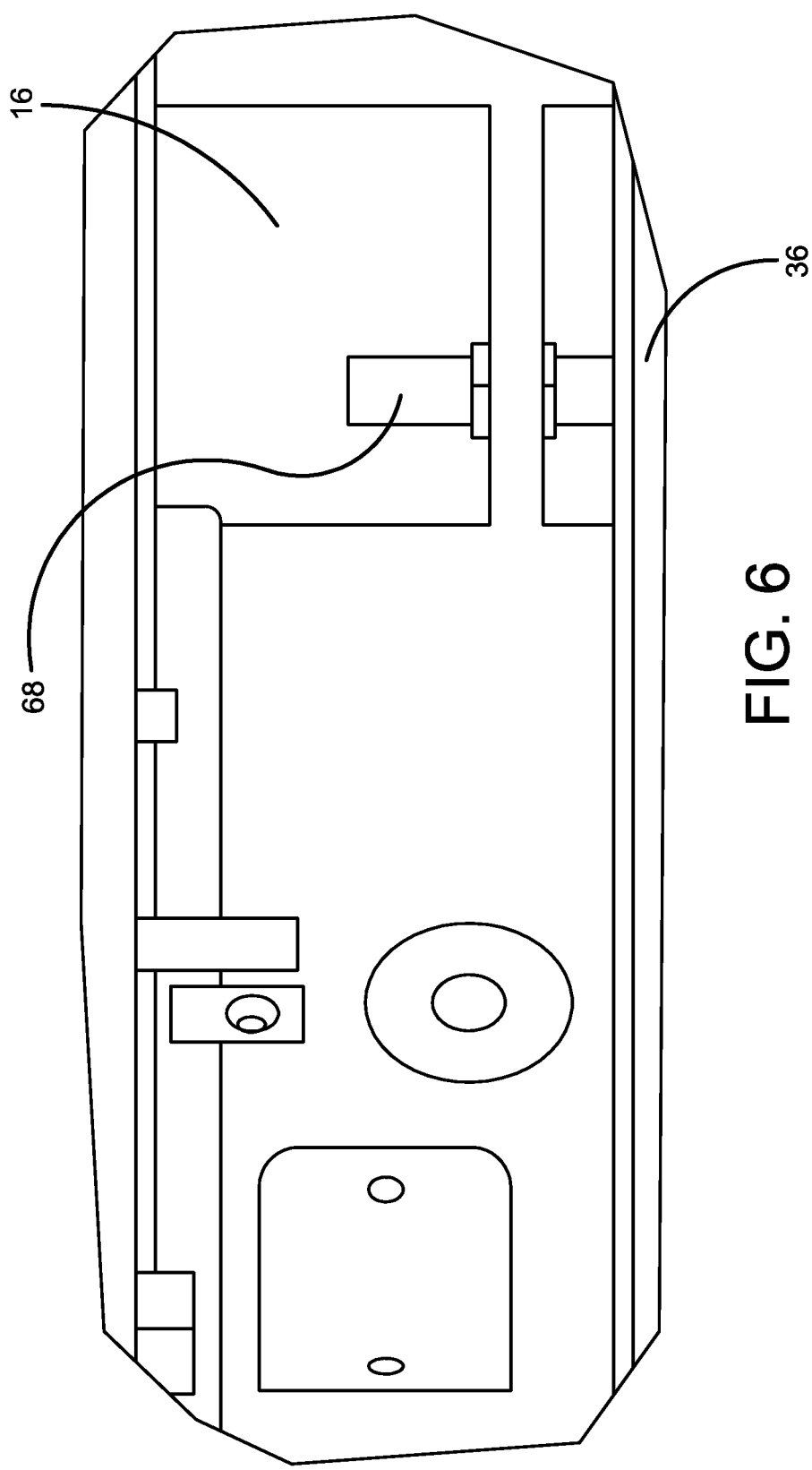
FIG. 6 is an illustrative showing of the proximity switch interposed between the coil housing and associated armature.

With reference to FIG. 6, it can be seen that a non-contact proximity switch 68 is installed in the coil housing 16 and provides a digital indication to an associated control system when the position of the armature 36 exceeds the axial limit of the design, indicating a need for service or refurbishing.

It will now be appreciated that the stationary coil housing 16 encompasses and maintains springs 22 that apply pressure or force to the armature 36 and a stack of a pair of separator plates 38 interleaved with three friction plates 34 and a stationary endplate 40. This multi-disc brake stack is released when a DC voltage is applied to the brake coil 14. The electromagnetic force of the coil 14 attracts the armature 36 across an air gap therebetween, thus reducing or overcoming the spring force applied to the brake stack and disengaging the brake. The brake may then be reapplied or actuated when the DC voltage is removed from the brake coil.

The foregoing multi-disc brake is capable of meeting the increasing demand for high-energy motor shaft brakes in a compact and efficient manner. A major drawback of designs for such brakes in the past has been the friction-induced vibration/shaft whirl exhibited during a braking event. The instant invention contemplates mitigating such problem in various ways.

Figure 8:
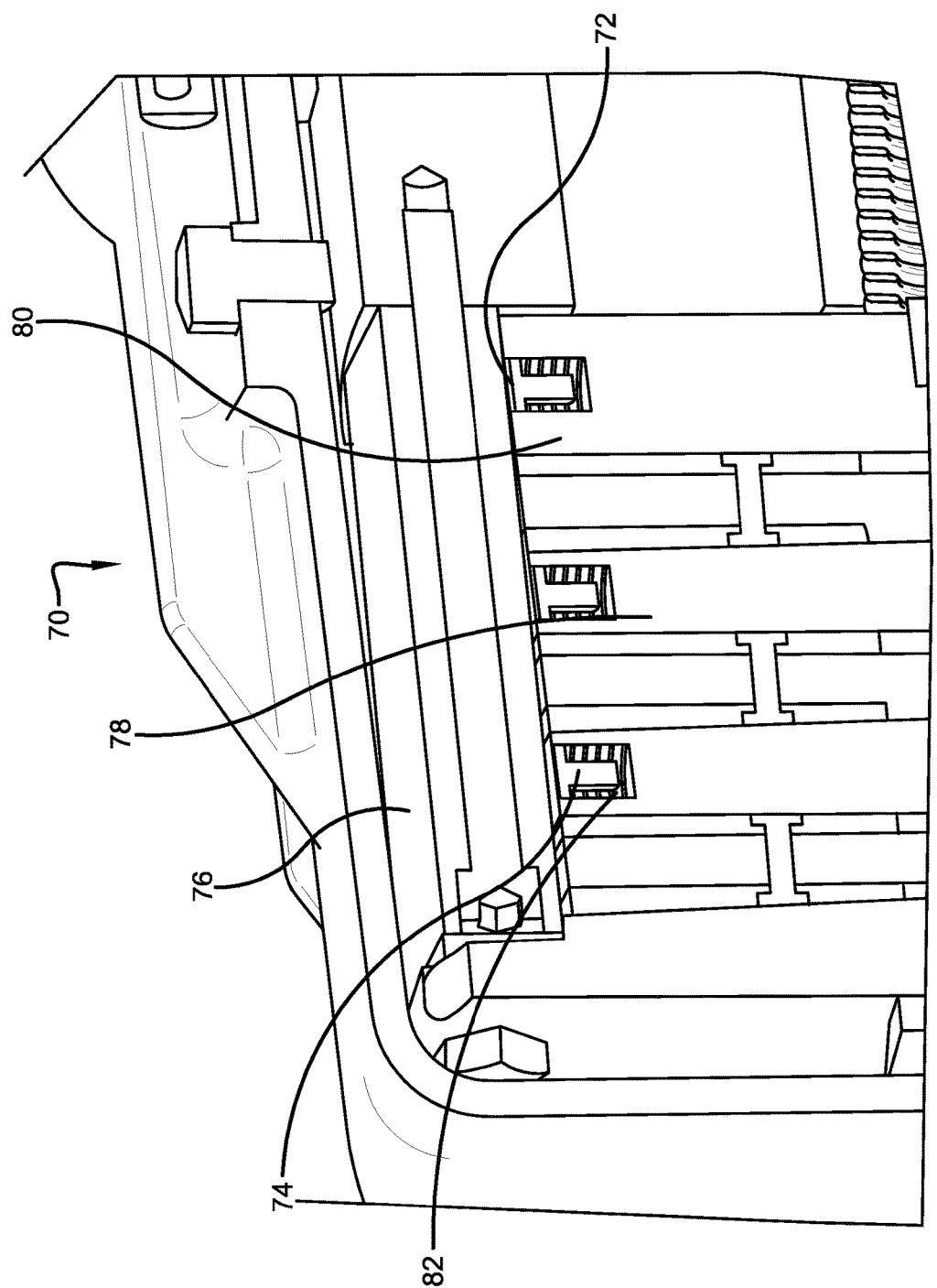
FIG. 8 is a cross-sectional view of an embodiment of the invention employing spring-applied friction pads for vibration damping.

One such approach is shown in FIG. 8 wherein a spring-applied friction pad is employed. Here a motor brake assembly, similar to that described above, is represented by the numeral 70. A plurality of friction pads 72 are attached to plungers 74. These plungers are forced by springs 82 between the torque blocks 76, separator plates 78, and armature 80, as shown. It will be appreciated that the torque blocks 76 are similar in nature to the torque blocks 24, described above, while the separator plates or discs 78 correspond to the separator discs 38, and the armature 80 corresponds to the armature 36, all presented above.

Figure 9:
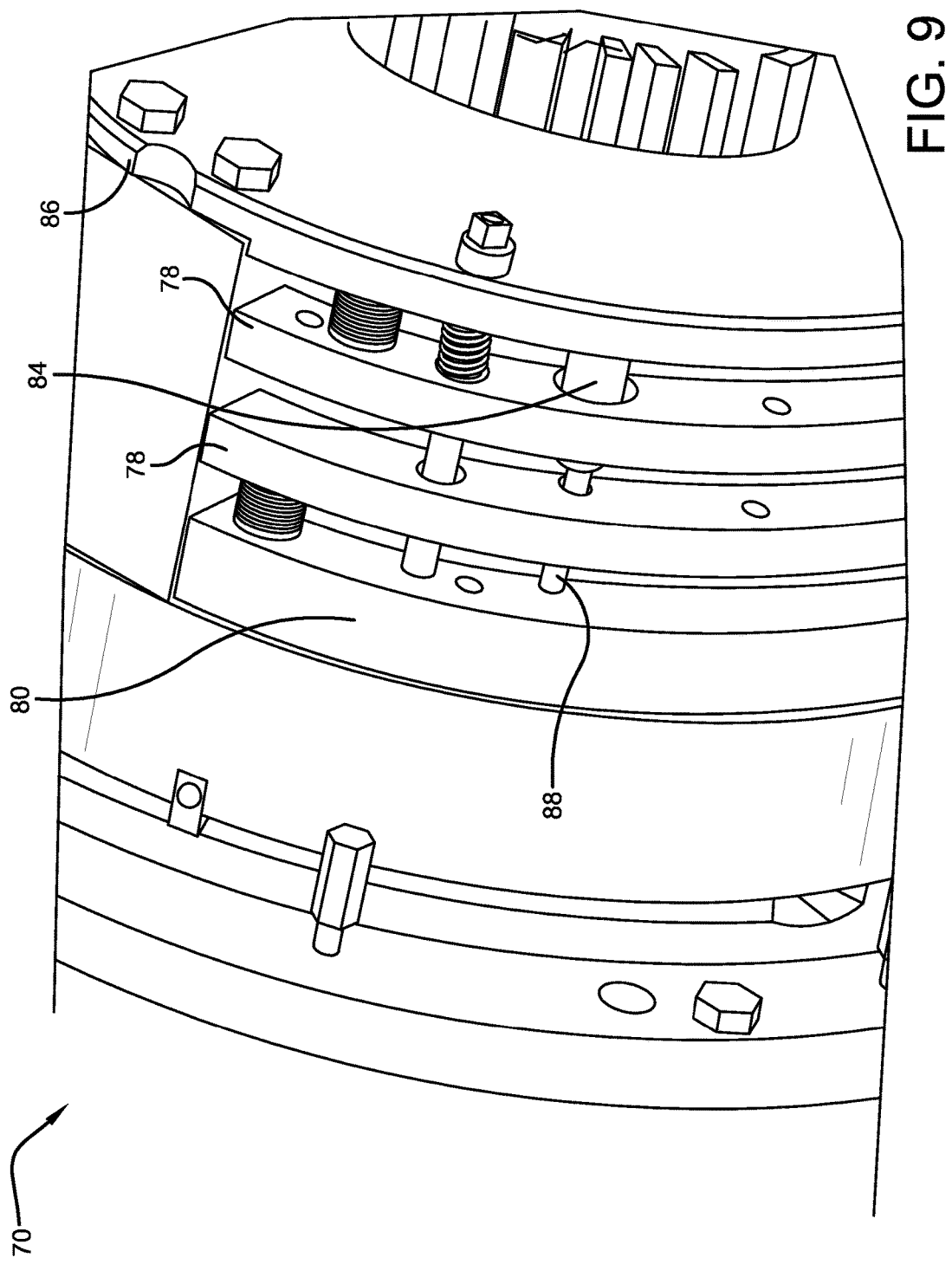
FIG. 9 is a sectional view of an embodiment of the invention employing an axial fluid damper for reducing vibrations.

In FIG. 9, the motor brake assembly 70 is provided with a fluid-type axial damper 84, which is interposed between the fixed endplate 86 and armature 80 by means of a plunger or piston rod 88. The axial damper can be of any appropriate type, but is presently contemplated to a be a fluid-filled chamber with a piston head having bores therethrough being movable within the fluid-filled piston chamber, the fluid restricting the movement of the piston head and piston rod 88 as a function of the viscosity of the fluid and the size of the apertures or holes.

Figure 10:
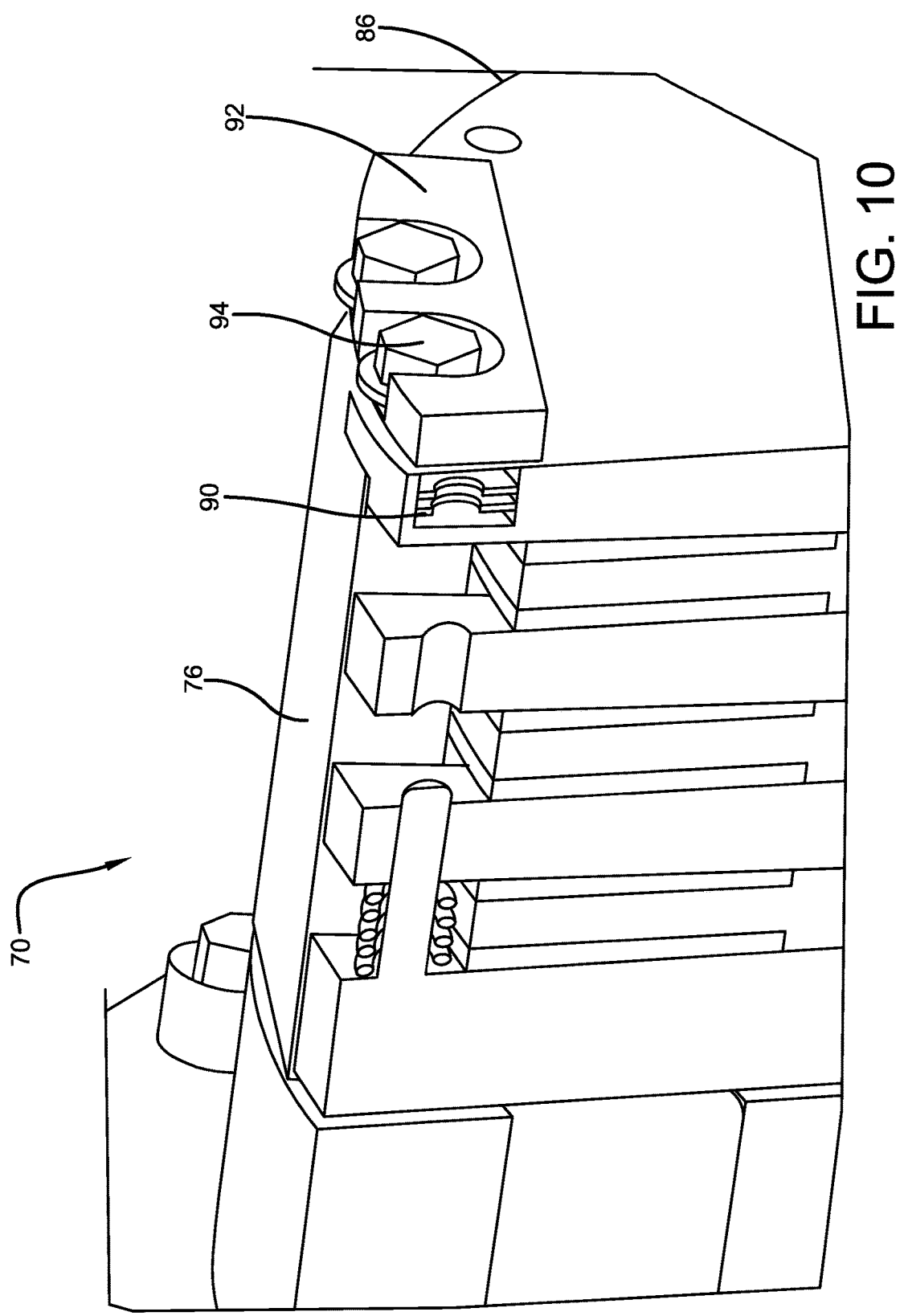
FIG. 10 shows an embodiment of the invention employing springs and bushings biased against the torque block for damping vibrations.
Figure 11:
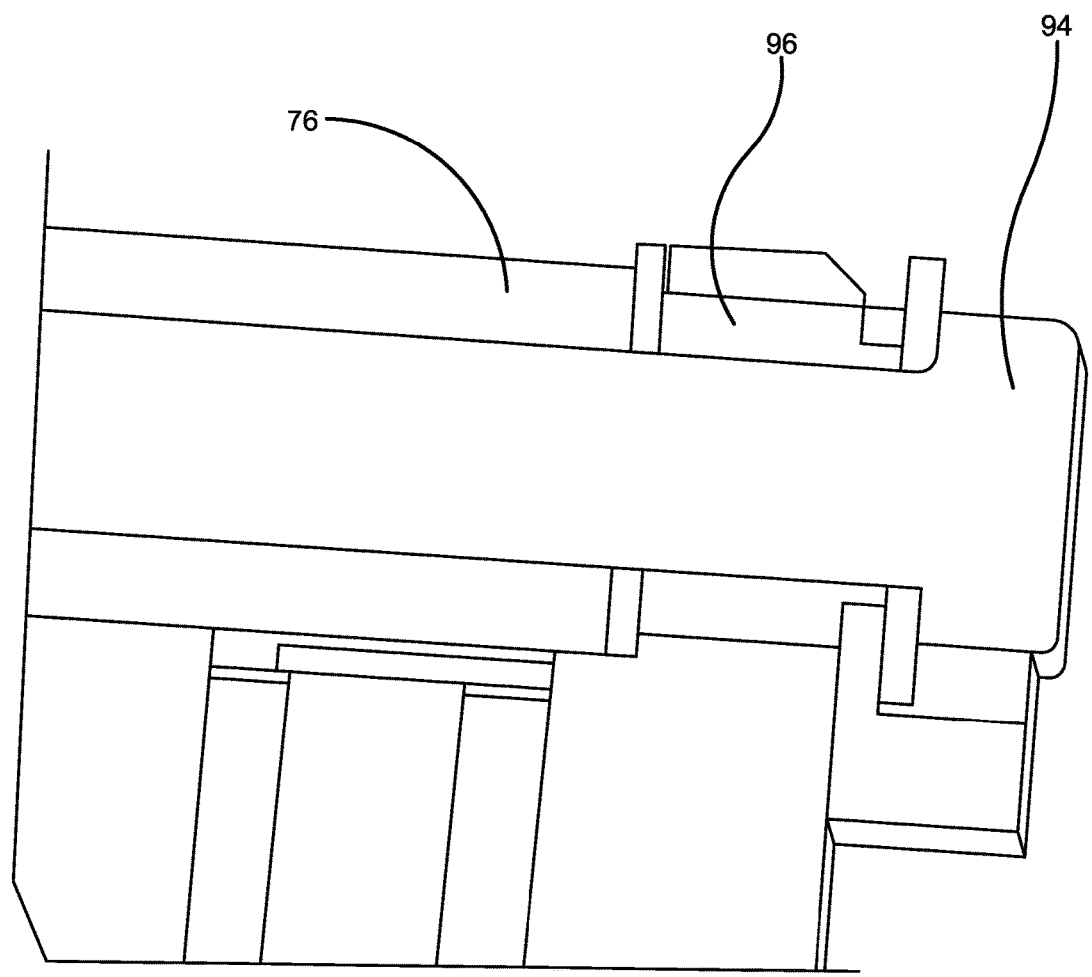
FIG. 11 is a sectional view of the structure of FIG. 10 showing the implementation of the bushings.

With reference to FIGS. 10 and 11, an apparatus and methodology for achieving the desired damping by the use of springs and bushings is shown. Here the motor brake 70 employs springs 90 introduced axially between the endplate 86 and spring plates 92, which are retained to the torque block 76 by means of bolts 94 and bushings 96. The springs 90 allow the endplate 86 to move axially along the bushings 96 until bottoming out on the spring plates 92. The detailed structure of the interrelationship of the bolts 94, bushings 96, and torque lock 76 is best shown in FIG. 11.

Figure 12:
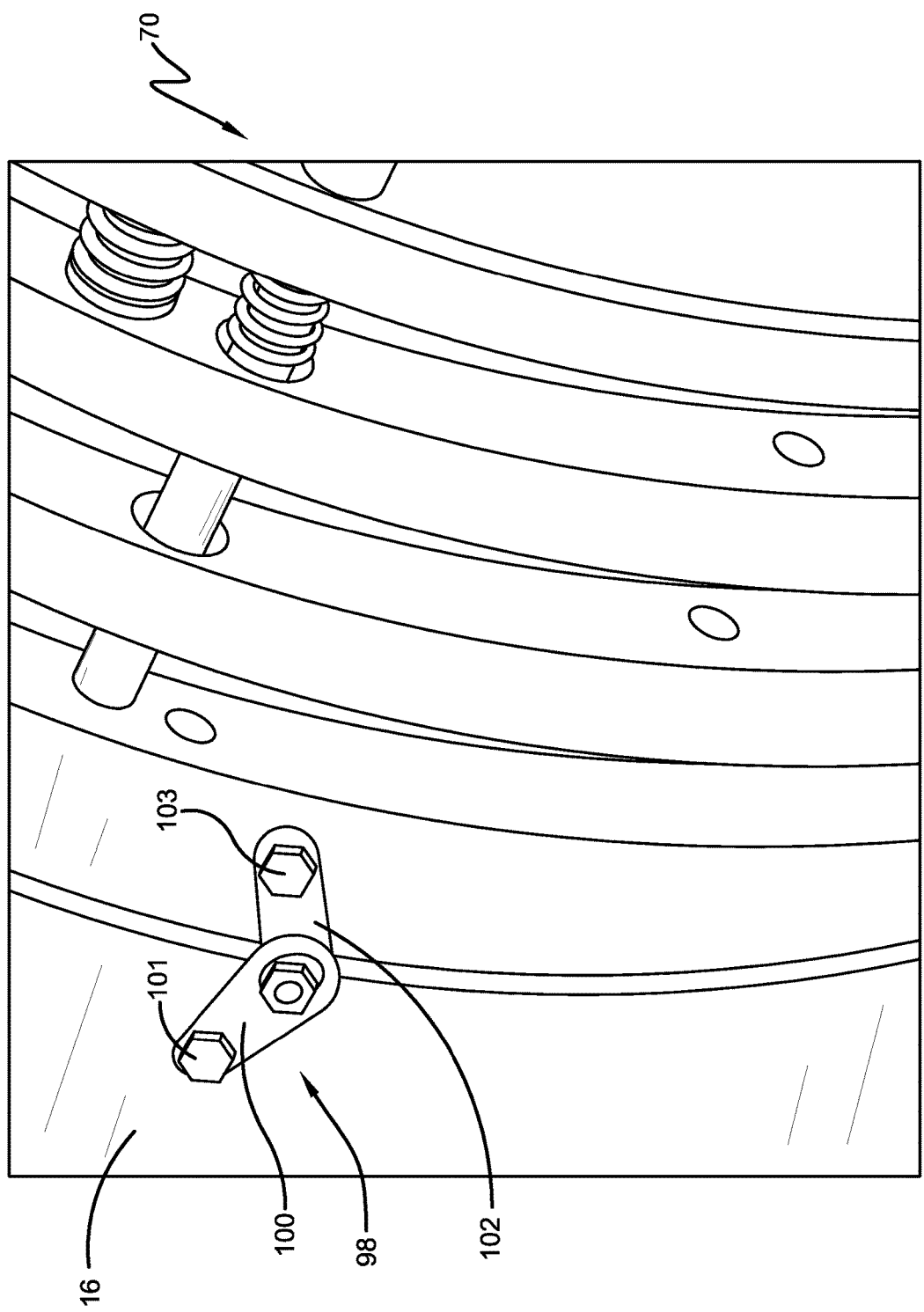
FIG. 12 is an illustrative view of an embodiment of the invention employing a friction-damped linkage between the armature and coil housing.
Figure 13:
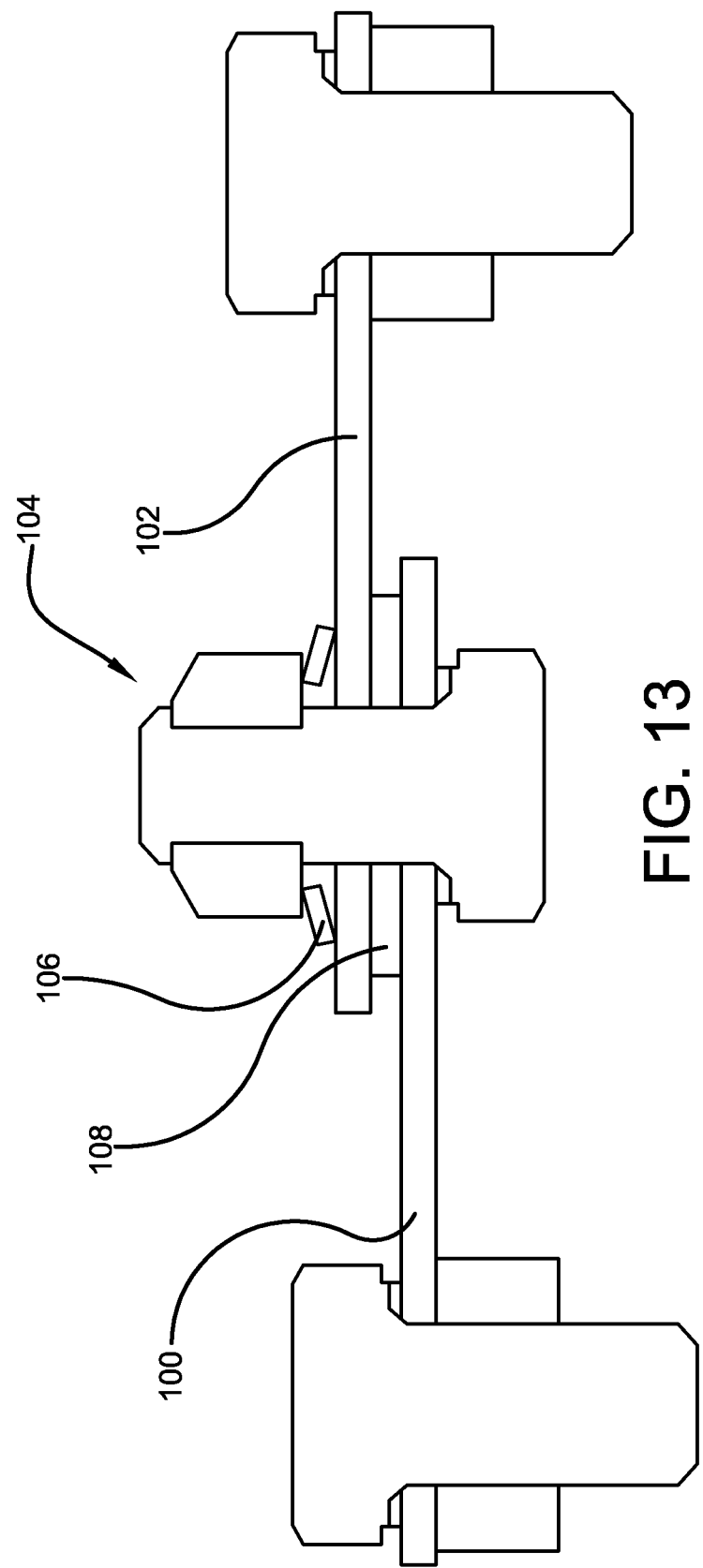
FIG. 13 is a detailed sectional view of friction-damped linkage according to the invention.

With attention now to FIGS. 12 and 13, it can be seen that a friction-damped linkage 98 may be employed in the motor brake assembly 70 for damping undesired vibrations. Here the linkage 98 is attached to the coil housing 16 and armature 36. The linkage damps the motion of the armature as the brake is released and applied. It achieves this damping by having a spring 106, which applies force to a friction pad 108 that resists the motion between the input and output arms 100, 102 as the armature is extended and retracted. A nut and bolt assembly 104 interconnects the arms 100, 102 with the spring 106 and friction pad 108 interconnected therewith.

Thus it can be seen that the various aspects of the invention have been achieved by the structures and techniques presented and described above. While in accordance with the patent statutes only the best known and preferred embodiments of the invention have been presented and described in detail, it is to be understood that the invention is not limited thereto or thereby. Accordingly, for an appreciation of the true scope and breadth of the invention, reference should be made to the following claims.

What is claimed is:

1. A multi-disc electric motor brake, comprising:
a motor mounting plate;
an electromagnetic coil attached to said motor mounting plate;
an armature in operative engagement with said electromagnetic coil;
a plurality of springs in axially biasing engagement with said armature;
a hub received on an end of a motor shaft, said hub engaging a plurality of friction rotors;
a plurality of torque reaction members attached to said mounting plate and in engagement with a plurality of separator stators interleaved with said friction rotors and forming a disc pack;
an endplate attached to said torque reaction members and axially encapsulating said disc pack; and
disc pack wear adjustment shims interposed between said endplate and said torque reaction members and further comprising an externally visible disc pack wear indicator comprising a thread form to manually release the brake by overcoming said springs in axially biasing engagement with said armature.

2. The multi-disc electric motor brake assembly according to claim 1, wherein said torque reaction members are parallel-sided blocks.

3. The multi-disc electric motor brake assembly according to claim 1, wherein said friction rotors and separator stators have tapered surfaces matingly engaging each other.

4. The multi-disc electric motor brake assembly according to claim 1, wherein said separator stators comprise self-contained, positive-release spring assemblies.

5. The multi-disc electric motor brake assembly according to claim 1, wherein said separator stators are radially slotted.

6. The multi-disc electric motor brake assembly according to claim 1, further comprising a sealed external enclosure engaging said mounting plate.

7. The multi-disc electric motor brake assembly according to claim 1, further comprising a spring plate assembly in axial interacting engagement with said endplate.

8. The multi-disc electric motor brake assembly according to claim 1, further
comprising spring-applied friction pads operative to resist motion of said separator stators in relation to said torque blocks.

9. The multi-disc electric motor brake assembly according to claim 1, further comprising a shock absorber interposed between said endplate and said armature.

10. The multi-disc electric motor brake assembly according to claim 1, further comprising a shock absorber interposed between said endplate and said armature.

11. A multi-disc electric motor brake, comprising:
a motor mounting plate;
an electromagnetic coil attached to said motor mounting plate;
an armature in operative engagement with said electromagnetic coil;
a plurality of springs in axially biasing engagement with said armature;
a hub received on an end of a motor shaft, said hub engaging a plurality of friction rotors;
a plurality of torque reaction members attached to said mounting plate and in engagement with a plurality of separator stators interleaved with said friction rotors and forming a disc pack;
an endplate attached to said torque reaction members and axially encapsulating said disc pack; and
a friction-damped linkage interposed between said armature and said mounting plate.

12. The multi-disc electric motor brake assembly according to claim 11, wherein said friction-damped linkage comprises a pair of arms extending between said armature and mounting plate, said arms being secured together with a friction member and spring therebetween.

13. The multi-disc electric motor brake assembly according to claim 11, wherein said torque reaction members are parallel-sided blocks.

14. The multi-disc electric motor brake assembly according to claim 11, wherein said friction rotors and separator stators have tapered surfaces matingly engaging each other.

15. The multi-disc electric motor brake assembly according to claim 11, wherein said separator stators comprise self-contained, positive-release spring assemblies.

16. The multi-disc electric motor brake assembly according to claim 11, wherein said separator stators are radially slotted.

17. The multi-disc electric motor brake assembly according to claim 11, further comprising a sealed external enclosure engaging said mounting plate.

18. The multi-disc electric motor brake assembly according to claim 11, further comprising a spring plate assembly in axial interacting engagement with said endplate.

19. The multi-disc electric motor brake assembly according to claim 11, further comprising spring-applied friction pads operative to resist motion of said separator stators in relation to said torque blocks.

\* \* \* \* \*